(12) United States Patent  
Du

(10) Patent No.: US 12,458,321 B2
(45) Date of Patent: Nov. 4, 2025

(54) ULTRASONIC IMAGE SENSOR AND RELATED ELECTRONIC DEVICE

(71) Applicant: HUIKE (SINGAPORE) HOLDING PTE.LTD., The Aries (SG)

(72) Inventor: Can Hong Du, Guangdong (CN)

(73) Assignee: HUIKE (SINGAPORE) HOLDING PTE.LTD., The Areis (SG)

( * ) Notice: Subject to any disclaimer, the term of this patent is extended or adjusted under 35 U.S.C. 154(b) by 143 days.

(21) Appl. No.: 18/456,401

(22) Filed: Aug. 25, 2023

(65) Prior Publication Data

US 2023/0397902 A1    Dec. 14, 2023

Related U.S. Application Data

(63) Continuation of application No. PCT/CN2021/122117, filed on Sep. 30, 2021.

(51) Int. Cl.
G06V 40/13 (2022.01)
A61B 8/00 (2006.01)
A61B 8/08 (2006.01)

(52) U.S. Cl.
CPC .......... *A61B 8/0858* (2013.01); *A61B 8/5269* (2013.01); *A61B 8/58* (2013.01); *G06V 40/1306* (2022.01)

(58) Field of Classification Search
None
See application file for complete search history.

(56) References Cited

U.S. PATENT DOCUMENTS 9,699,396 B2    7/2017  Schneider et al.
10,775,500 B2   9/2020  Taghibakhsh
(Continued)

FOREIGN PATENT DOCUMENTS

CN    103181786 A    7/2013
CN    105426865 A    3/2016
(Continued)

OTHER PUBLICATIONS

European search report issued by European Patent Office on Aug. 21, 2024.
(Continued)

*Primary Examiner* — Joseph R Haley
(74) *Attorney, Agent, or Firm* — WPAT, P.C.; Anthony King

(57) ABSTRACT

The present application discloses an ultrasonic image sensor and a related electronic device. The ultrasonic image sensor is coupled to a sinusoidal pulse signal generating circuit. The ultrasonic image sensor and the sinusoidal pulse signal generating circuit are provided below a cover plate. The ultrasonic image sensor is used to sense a surface pattern of an object to be measured that makes contact with the cover plate from above the cover plate. The ultrasonic image sensor includes: an upper electrode; a lower electrode array; a piezoelectric layer, which is provided between the upper electrode and the lower electrode array, wherein the piezoelectric layer is excited by means of a sinusoidal pulse signal generated by the sinusoidal pulse signal generating circuit so as to generate an ultrasonic wave, the ultrasonic wave is transmitted along the cover plate to the object to be measured and then a reflected echo is generated.

12 Claims, 8 Drawing Sheets

(56) References Cited

U.S. PATENT DOCUMENTS

| | | | |
|---|---|---|---|
| 11,468,702 B1* | 10/2022 | Wang | G06F 3/04166 |
| 2013/0136321 A1 | 5/2013 | Lee et al. | |
| 2015/0338952 A1* | 11/2015 | Shahparnia | G06F 3/0443 |
| | | | 345/174 |
| 2017/0316243 A1 | 11/2017 | Ghavanini | |
| 2019/0155451 A1* | 5/2019 | Yeh | G06F 3/0443 |
| 2021/0305487 A1* | 9/2021 | Li | H10N 30/05 |
| 2022/0164562 A1* | 5/2022 | Pan | G06V 40/13 |

FOREIGN PATENT DOCUMENTS

| | | |
|---|---|---|
| CN | 105993020 A | 10/2016 |
| CN | 106462751 A | 2/2017 |
| CN | 106557724 A | 4/2017 |
| CN | 107491774 A | 12/2017 |
| CN | 108537179 A | 9/2018 |
| CN | 109241891 A | 1/2019 |
| CN | 109492461 A | 3/2019 |
| CN | 110298288 A | 10/2019 |
| CN | 110472606 A | 11/2019 |
| CN | 111881877 A | 11/2020 |
| CN | 112597849 A | 4/2021 |
| EP | 3343335 A1 | 7/2018 |
| JP | S6085379 A | 5/1985 |
| JP | 2003075486 A | 3/2003 |
| JP | 2003090703 A | 3/2003 |
| JP | 2006003278 A | 1/2006 |
| KR | 20030073508 A | 9/2003 |
| KR | 101862985 B1 | 5/2018 |
| WO | WO 2017003848 A1 | 1/2017 |
| WO | WO2018166057 A1 | 9/2018 |

OTHER PUBLICATIONS

Guo Yuqing, Principle and Application of Fingerprint Sensor, Applications of IC, Jun. 2005, p. 32-34.
English abstract translatin of Guo Yuqing, Principle and Application of Fingerprint Sensor, Applications of IC, Jun. 2005, p. 32-34.
Zhang Liang, Key technology and development trend of fingerprint image sensor, Journal of Transducer Technology, vol. 24, Issue 9, Mar. 7, 2005.
Sergio Franco, Design with Operational Amplifiers and Analog Integrated Circuits, Chapter 9, p. 417-421.
Tang, H.-Y., Lu, Y., Jiang, X., Ng, E. J., Tsai, J. M., Horsley, D. A., Boser, B. E. (2016). 3-D ultrasonic fingerprint sensor-on-a-chip. IEEE Journal of Solid-State Circuits, 51(11), 2522-2533. https://doi.org/10.1109/jssc.2016.2604291.
English abstract translation of KR20030073508A.
English abstract translation of KR101862985B1.
English abstract translation of JP2006003278A.
English abstract translation of JP2003090703A.
English abstract translation of JP2003075486A.
English abstract translation of JPS6085379A.
English abstract translation of CN112597849A.
English abstract translation of CN111881877A.
English abstract translation of CN110472606A.
English abstract translation of CN110298288A.
English abstract translation of CN109492461A.
English abstract translation of CN109241891A.
English abstract translation of CN108537179A.
English abstract translation of CN107491774A.
English abstract translation of CN106557724A.
English abstract translation of CN106462751A.
English abstract translation of CN105993020A.
English abstract translation of CN105426865A.
English abstract translation of CN103181786A.
As-filed PCT application of PCT/CN2021/122117.
As-filed PCT Request of PCT/CN2021/122117.
International Searching Authority (ISA) Form 202—Notification of Receipt of Search PCT/CN2021/122117.
International Searching Authority (ISA) Form 210—International Search Report of PCT/CN2021/122117.
International Searching Authority (ISA) Form 220—Notification of Transmittal of the International Search Report and the Written Opinion of the International Searching Authority, or the Declaration of PCT/CN2021/122117.
International Searching Authority (ISA) Form 237—Written Opinion of PCT/CN2021/122117.
Notification of the International Application number and of the International Filing Date—Form 105 of PCT/CN2021/122117.
Publication PCT Application of PCT/CN2021/122117 published as WO 2023/050291.

* cited by examiner

ULTRASONIC IMAGE SENSOR AND RELATED ELECTRONIC DEVICE

CROSS-REFERENCE TO RELATED APPLICATIONS

This application is a continuation of International Application No. PCT/CN2021/122117, filed on Sep. 30, 2021, the disclosure of which is hereby incorporated by reference in its entirety.

TECHNICAL FIELD

The present application relates to a sensor, particularly an ultrasonic image sensor and a related electronic device.

BACKGROUND

Under-screen fingerprint recognition is a fingerprint recognition technology that has emerged in recent years, but current under-screen fingerprint recognition solutions often have many defects and there is room for improvement in terms of resolution, sensitivity and signal-to-noise ratio. Therefore, how to solve the above-mentioned issues has become an urgent issue in this field.

SUMMARY

One purpose of the present disclosure is to disclose an ultrasonic image sensor and a related electronic device to address the above-mentioned issues.

One embodiment of the present disclosure disclose an ultrasonic image sensor, in which the ultrasonic image sensor is coupled to a sinusoidal pulse signal generating circuit, the ultrasonic image sensor and the sinusoidal pulse signal generating circuit are provided below a cover plate, the ultrasonic image sensor is configured to sense a surface pattern of an object to be measured that makes contact with the cover plate from above the cover plate, and the ultrasonic image sensor includes: an upper electrode, coupled to the sinusoidal pulse signal generating circuit; a lower electrode array, including a first lower electrode; a piezoelectric layer, provided between the upper electrode and the lower electrode array, wherein the piezoelectric layer is excited to generate ultrasonic wave by means of the sinusoidal pulse signal generated by the sinusoidal pulse signal generating circuit, a reflected echo is generated after the ultrasonic wave is transmitted along the cover plate to the object to be measured, and the reflected echo plate is transmitted back to the piezoelectric layer along the cover, so that the piezoelectric layer generates a receiving signal; and a detection circuit array, including a first detection circuit, coupled to the first lower electrode and configured to determine the amplitude of the receiving signal, wherein the first detection circuit includes: an operational amplifier, having a positive end, a negative end and an output end, wherein the output end is configured to output a sensing result of the ultrasonic image sensor; a capacitor unit, coupled between the output end of the operational amplifier and the negative end; a reset switch, arranged in parallel with the capacitor unit; a first switch, coupled between a reference voltage and the first lower electrode; and a second switch, coupled between the first lower electrode and the negative end of the operational amplifier.

One embodiment of the present disclosure disclose an electronic device, including the above-mentioned ultrasonic image sensor; the sinusoidal pulse signal generating circuit; and the cover plate.

Compared to the conventional art, the ultrasonic image sensor and related electronic device according to the present disclosure has the technical effects of high resolution and high sensitivity.

DETAILED DESCRIPTION

Figure 1:
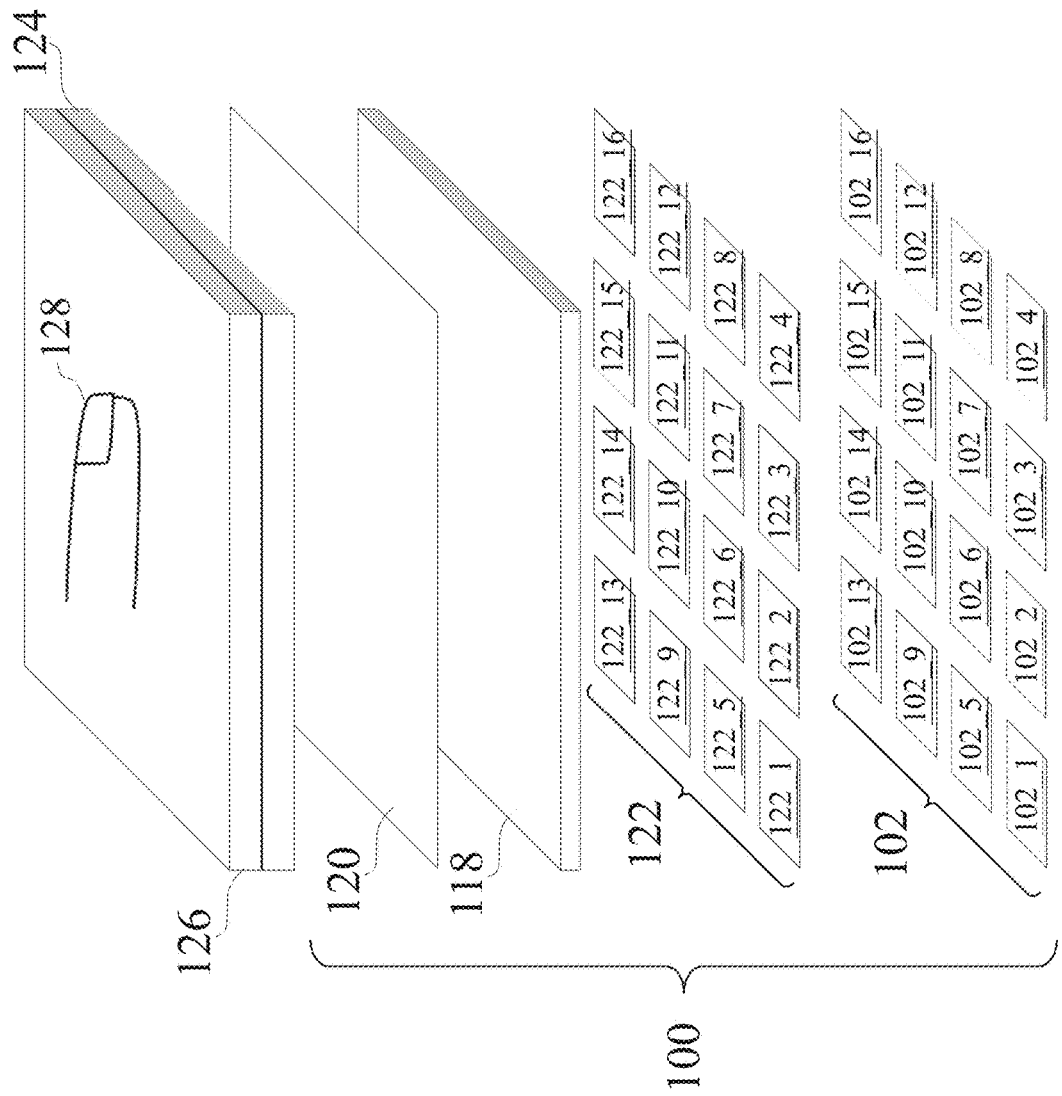
FIG. 1 is a three-dimensional schematic diagram illustrating an ultrasonic image sensor according to a first embodiment of the present disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or symbols in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a three-dimensional schematic diagram illustrating an ultrasonic image sensor according to a first embodiment of the present disclosure. An ultrasonic image sensor 100 is provided below the cover plate 126 and configured to sense a surface pattern of an object to be measured (such as a finger 128) that makes contact with the cover plate from above the cover plate 126. The ultrasonic image sensor 100 and the cover plate 126 can be further provided with a display screen 124, and such an arrangement can be used to implement under-screen fingerprint recognition; however, the applications of the ultrasonic image sensor 100 according to the present disclosure are not limited thereto.

The ultrasonic image sensor 100 includes a detection circuit array 102, a lower electrode array 122, a piezoelectric layer 118 and an upper electrode 120. In the present embodiment, the detection circuit array 102 is implemented using the complementary metal oxide semiconductor (CMOS) process and includes a plurality of detection circuits 102_1~102_16 of the same structure and disposed in the same plane, the lower electrode array 122 includes a plurality of lower electrodes 122_1~122_16 of the same structure and disposed in the same plane, and the plurality of detection circuits 102_1~102_16 and the plurality of lower electrodes 122_1~122_16 are coupled to each other in a one-to-one relationship. It should be noted that the number and arrangement of the detection circuits included in the detection circuit array 102 are only illustrative; similarly, the number and arrangement of the lower electrodes included in the lower electrode array 122 are also illustrative only.

the piezoelectric layer 118 is made of materials with piezoelectric effect, including but not limited to polyvinylidene fluoride and polyvinylidene fluoride-trifluoroethylene copolymer, etc. The thickness of the piezoelectric layer 118 affects the frequency of ultrasonic waves generated by the piezoelectric layer 118, for example, a thickness of 9 um corresponds to an ultrasonic wave emission frequency of about 12 MHz.

Figure 2:
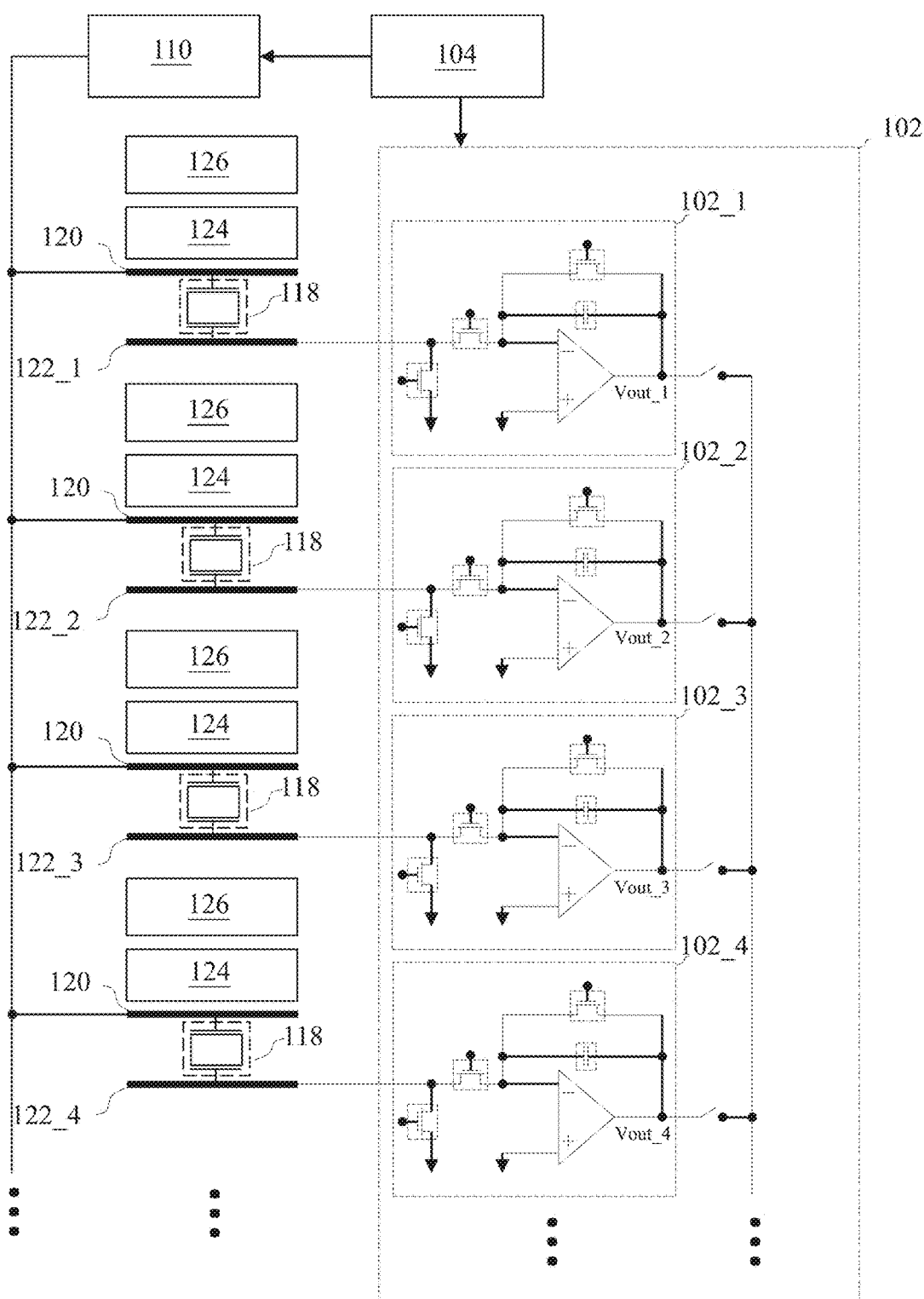
FIG. 2 is a schematic diagram illustrating the circuit connection of the ultrasonic image sensor of FIG. 1 when provided in an electronic device.
Figure 3:
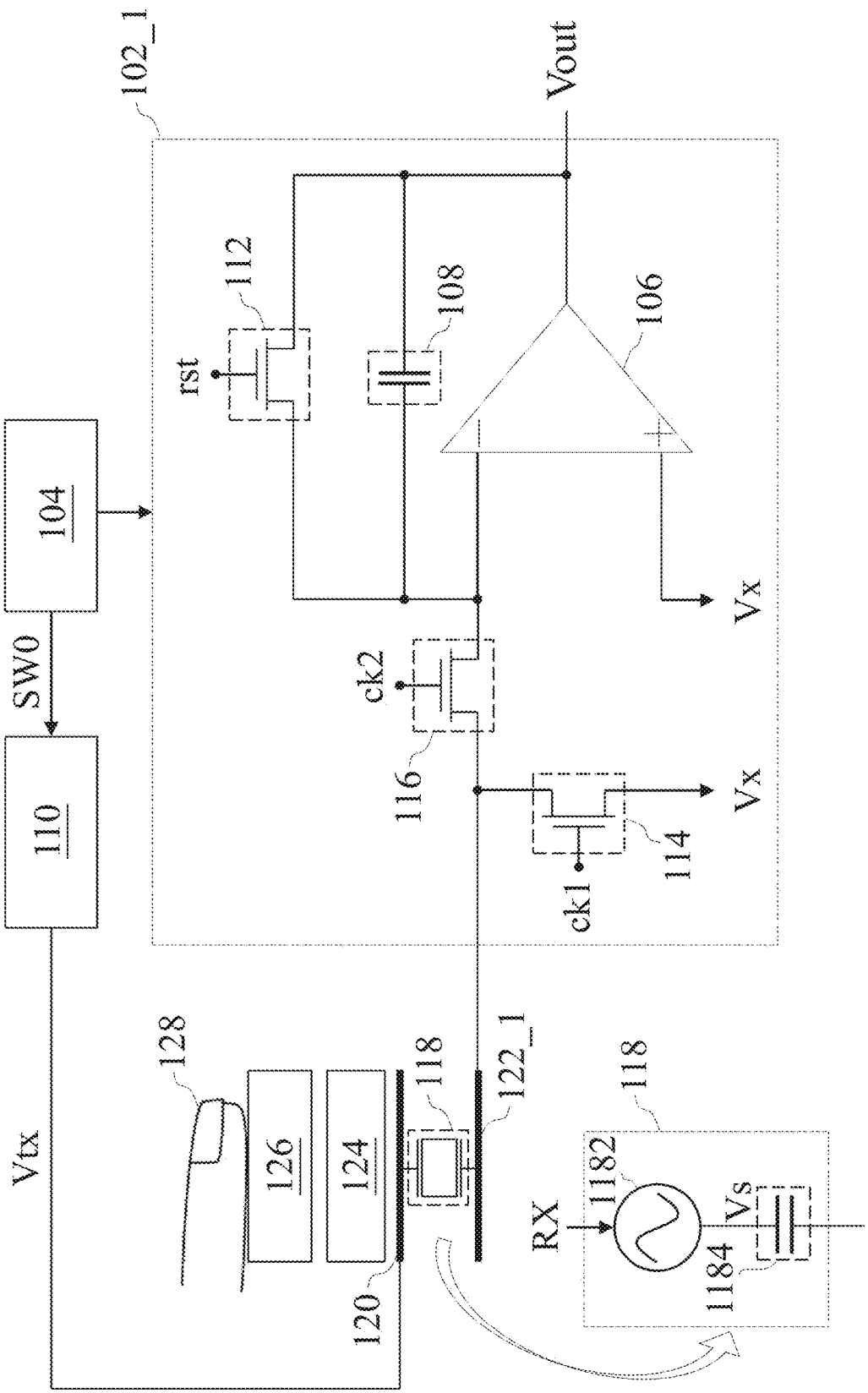
FIG. 3 illustrates the partial details of the electronic device of FIG. 2.

FIG. 2 is a schematic diagram illustrating the circuit connection of the ultrasonic image sensor of FIG. 1 when provided in an electronic device. The electronic device 200 includes the ultrasonic image sensor 100, the display screen 124, and the cover plate 126 shown in FIG. 1, a sinusoidal pulse signal generating circuit 110 and a control circuit 104. The control circuit 104 is configured to control the sinusoidal pulse signal generating circuit 110 and a plurality of detection circuits 102_1~102_16 of the detection circuit array 102. FIG. 3 illustrates the details of certain components of the electronic device 200, and the detection circuit 102_1 of FIG. 3 is used below to explain the operational principles of the ultrasonic image sensor 100 and the related electronic device 200 according to the present disclosure.

Figure 4:
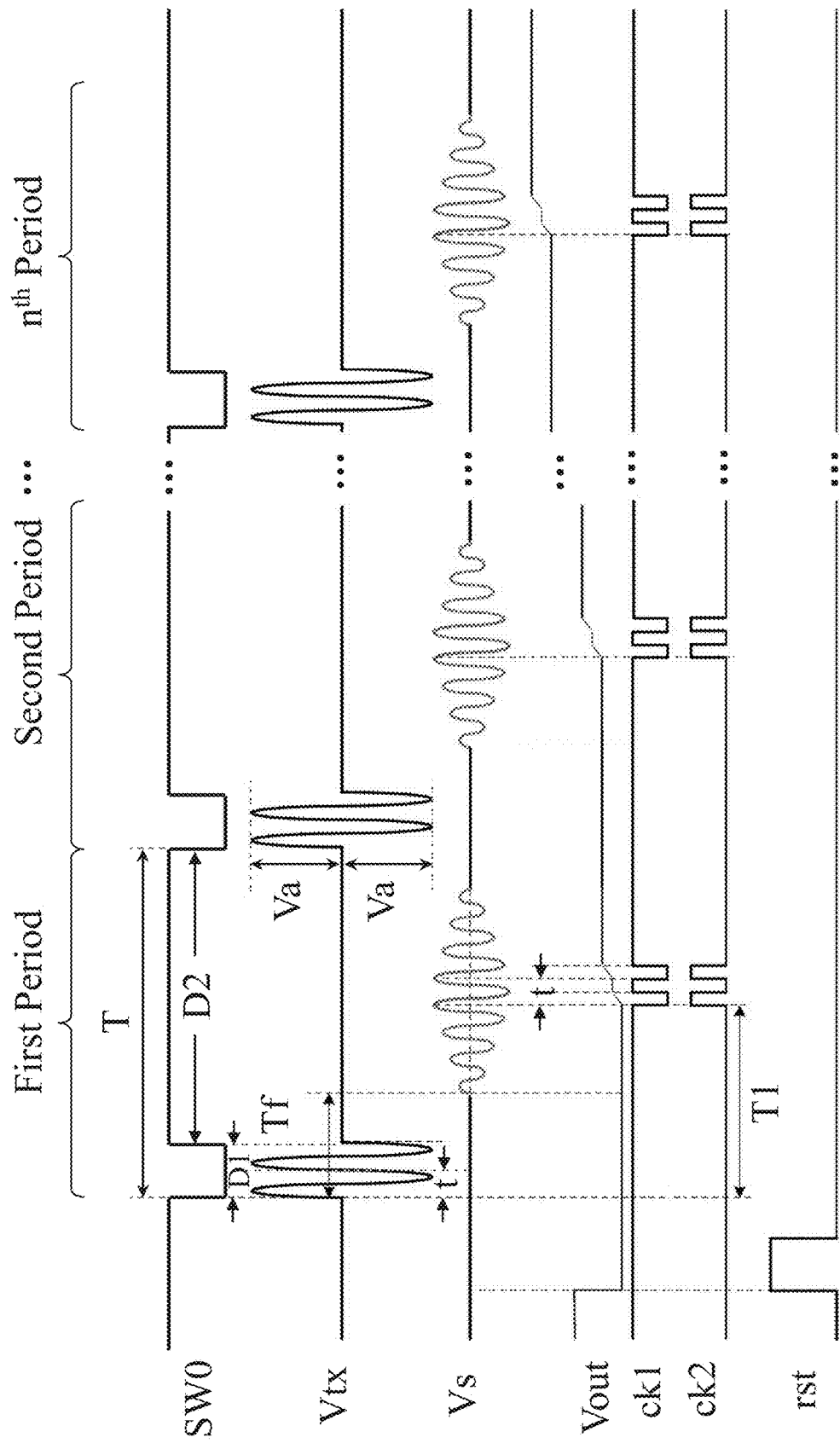
FIG. 4 is a timing diagram of the operation of the electronic device of FIG. 2.

The control circuit 104 is configured to generate a control signal SW0, which is used to control the sinusoidal pulse signal generating circuit 110 to generate a sinusoidal pulse signal Vtx. As shown in FIG. 4, the sinusoidal pulse signal Vtx has a pulse period T, and the pulse period T includes a first time period D1 and a second time period D2, wherein the voltage of the sinusoidal pulse signal Vtx is not fixed in the first time period D1 and the signal is a sinusoidal wave; in the present embodiment, the first time period D1 includes two consecutive high-voltage sinusoidal waves, wherein two high-voltage sinusoidal waves have a period of t and a frequency between 1 and 30 MHz; that is, in each pulse period T, the number of sinusoidal wave pulses N is 2 and the amplitude is Va, i.e., the peak-to-peak voltage is 2Va; in the present embodiment, Va is greater than 5V, and in some embodiments it can even be greater than 80V to increase the transmission intensity as much as possible; in the second time period D2, the voltage of the sinusoidal pulse signal is fixed at the direct current bias voltage Vd.

Reference is made to both FIG. 3 and FIG. 4, the sinusoidal pulse signal generating circuit 110 is coupled to the upper electrode 120, and the two high-voltage sinusoidal waves in each pulse period T of the sinusoidal pulse signal Vtx will cause the piezoelectric layer 118 to be excited by the high-voltage sinusoidal waves at both ends, so that the piezoelectric layer 118 will convert the electrical energy into mechanical energy, i.e., generate ultrasonic waves that travel through the display screen 124 and along the cover plate 126. The ultrasonic wave reaches the finger 128 and then generates a reflected echo, which is transmitted along the cover plate 126, passes through the display screen 124 and then returns to the piezoelectric layer 118, which converts the mechanical energy into electrical energy, i.e., generates the receiving signal Vs. The receiving signal Vs is a series of sine wave pulses, whose amplitude is related to the fingerprint pattern valley ridge, so the amplitude of the receiving signal Vs is sensed by the detection circuit 102_1, which can be used to obtain the fingerprint pattern. It should be noted that the ultrasonic image sensor of the present disclosure can also sense the depth pattern of the surface of the object to be measured other than the finger.

The detection circuit 102_1 includes an operational amplifier 106, a capacitor unit 108, a reset switch 112, a first switch 114 and a second switch 116. In this case, the operational amplifier 106 has a positive end (+), a negative end (−) and an output end. The capacitance of the capacitor unit 108 is CI, and the capacitor unit 108 is coupled between the output end and the negative end (−) of the operational amplifier 106. The reset switch 112 and the capacitor unit 108 are connected in parallel. The first switch 114 is coupled between a reference voltage Vx and the lower electrode 122_1. The second switch 116 is coupled between the lower electrode 122_1 and the negative end (−) of the operational amplifier 106. The positive end (+) of the operational amplifier 106 is coupled to the reference voltage Vx. In this case, the reset switch 112 is under the control of the signal rst, the first switch 114 is under the control of the signal ck1, and the second switch 116 is under the control of the signal ck2. The signal rst, the signal ck1 and the signal ck2 are generated by the control circuit 104. In the present embodiment, the reset switch 112, the first switch 114 and the second switch 116 can be implemented using N-type transistors; however, the present disclosure is not limited thereto.

The piezoelectric layer 118 equivalently includes a signal generator 1182 and a parasitic capacitor 1184. The signal generator 120 is configured to generate the receiving signal Vs according to a reflected echo RX. The parasitic capacitor 1184 is coupled to the signal generator 1182 and is configured to receive the receiving signal Vs. In this case, the capacitance of the parasitic capacitor 1184 of the piezoelectric layer 118 is CS.

As shown in FIG. 4, when SW0 is a low voltage level, the piezoelectric layer 118 operates in the ultrasonic wave transmitting phase, and after a time period Tf from the ultrasonic wave transmitting phase, the reflected echo returns back to the piezoelectric layer 118, so that the piezoelectric layer 118 operates in the ultrasonic wave receiving phase, and it should be ensured that the N consecutive high-voltage sinusoidal waves are transmitted within the time period Tf to avoid the situation of interference with each other. Therefore, in this embodiment N is only 2. However, even if N is only 2, complex reflection superposition is generated during the ultrasonic wave transmission process, so that the receiving signal Vs will be broadened to a series of sinusoidal pulses. In the present embodiment, the two sinusoidal waves with the greatest amplitude in the receiving signal Vs are selected for sampling the amplitude to improve accuracy. In FIG. 4, the time interval between the onset of the two sinusoidal waves with the greatest amplitude and the onset of the ultrasonic wave transmitting phase is T1.

The ultrasonic wave transmitting phase and ultrasonic wave receiving phase can be repeated by a plurality of successive pulse periods T, wherein the amplitude of the two sinusoidal waves with the greatest amplitude are sampled in each pulse period T, and the sampling results are continuously accumulated.

Specifically, the detection circuit 102_1 enters a reset phase when the signal rst is a high voltage level, according to the present disclosure. In the reset phase, the reset switch 112 is turned on, and the signal ck2 is low voltage level, so that the second switch 116 is turned off. Since the operational amplifier 106 forms a negative feedback, the output end and the negative end (−) voltages of the operational amplifier 106 will be limited to the same voltage as the positive end (+) voltage, i.e., the reference voltage Vx. Also, the capacitor unit 108 has the same voltage at both ends so that its capacitance is cleared to zero. Furthermore, during the reset phase, the signal ck1 may be a high voltage level, so that the first switch 114 is turned on to incidentally reset the equivalent capacitor 118 of the receiver 104.

When the signal rst is a low voltage level, the reset switch 112 is turned off, and the detection circuit 102_1 enters a general phase. Specifically, in the general phase, if it is intended to sample the amplitude of the receiving signal Vs, the first switch 114 and the second switch 116 need to be switched according to the frequency of the receiving signal Vs. In the operating embodiment shown in FIG. 4, during the period when the two sinusoidal waves having the greatest amplitude of drop from the peak to the trough, the signal ck1 is low voltage level such that the first switch 114 is turned off, and the signal ck2 is high voltage level such that the second switch 116 is turned on, and hence the detection circuit 102_1 enters the sampling mode.

During the remaining period of the general phase, the first switch 114 is turned on and the second switch 116 is turned off, such that the detection circuit 102_1 enters a non-sampling mode. Therefore, to the two consecutive periods t at the beginning of the time point T1, the detection circuit 102_1 is in the sampling mode for half of the time (t*0.5) during each period t, and the detection circuit 102_1 is in the non-sampling mode for another half of the time (t*0.5).

As shown in FIG. 4, in each sampling mode, the voltage change of the receiving signal Vs is reflected in a specific proportion and accumulates at the output end of the operational amplifier 106 and contributes to ΔVout. If the amplitude of the receiving signal Vs is VA and the received signal Vs drops from the peak to the trough, i.e., the voltage change of the receiving signal Vs is −2*VA, then ΔVout=2*VA*CS/CI, so that the voltage Vout at the output end of the operational amplifier 106 is accumulated upward. Since ΔVout is proportional to the amplitude VA of the receiving signal Vs, the detection can be achieved. As long as the device does not enter the reset phase, in each repetition of the sampling mode, the voltage Vout at the output end of the operational amplifier 106 is increase by ΔVout, and hence, after n periods, the output voltage Vout=Vx+n*2*ΔVout. In this way, the sensitivity of the detection circuit 102_1 can be increased.

In each non-sampling mode, the voltage change of the receiving signal Vs does not respond and does not accumulate at the output end of the operational amplifier 106, so that the voltage Vout of the output end of the operational amplifier 106 is kept constant in the non-sampling mode.

In certain embodiments, the sampling mode can also be carried out during the period when the receiving signal Vs rises from the trough to the peak. In this scenario, the voltage change of the receiving signal Vs is 2*VA, and thus ΔVout=−2*VA*CS/CI. In other word, the voltage Vout of the output end of the operational amplifier 106 is accumulated negatively from the reference voltage Vx downward.

Figure 5:
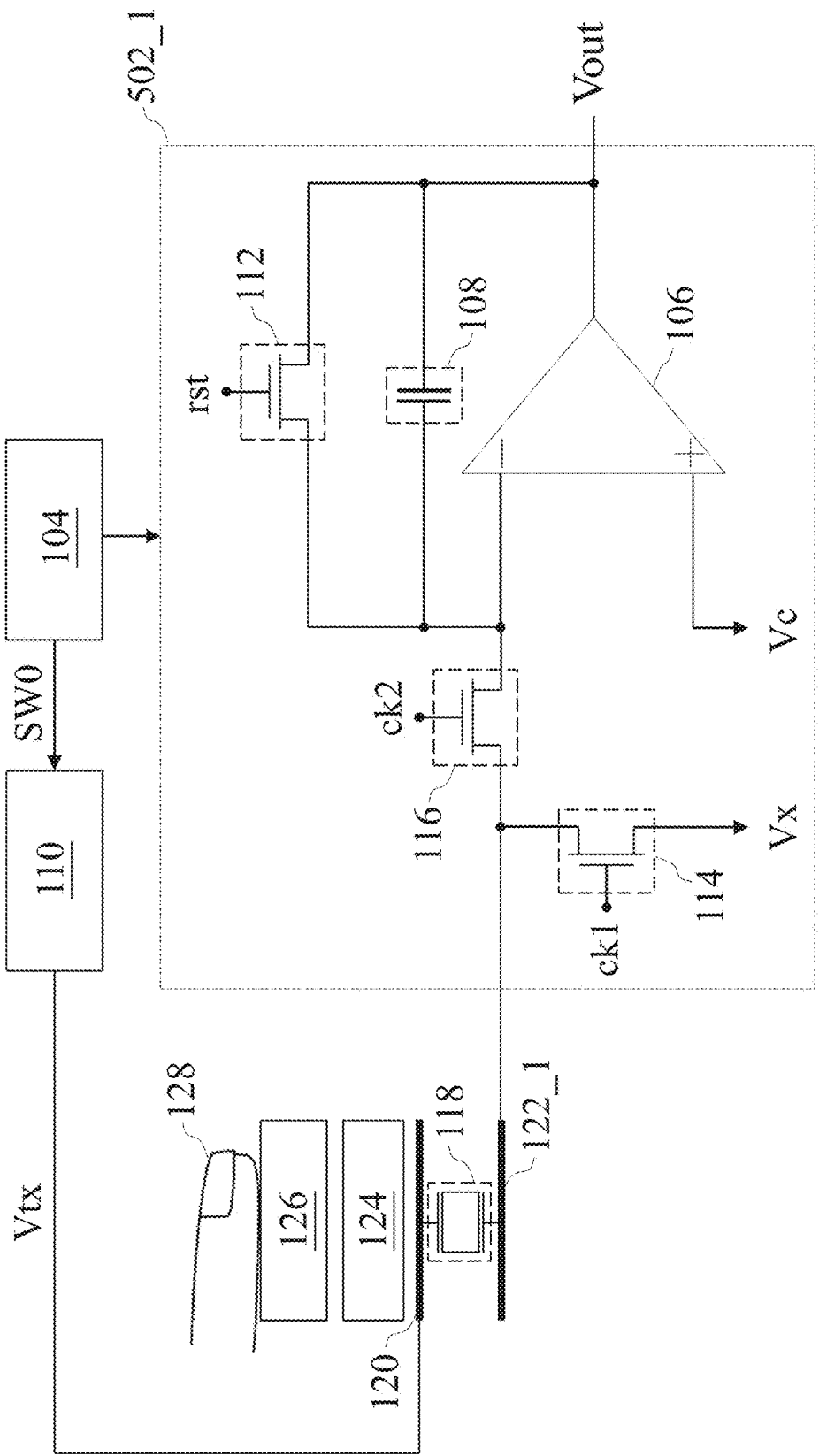
FIG. 5 is a schematic diagram illustrating an ultrasonic image sensor according to a second embodiment of the present disclosure.

In certain embodiments, due to non-ideal factors such as device mismatch and parasitic capacitance, the output voltage Vout at the output end of the operational amplifier 106 may have static noise, which occupies the dynamic range of the detection circuit 102_1. FIG. 5 is a schematic diagram illustrates a second embodiment of the ultrasonic image sensor according to the present disclosure; the detection circuit 502_1 in FIG. 5 can be used to replace each of the detection circuits 102_1~102_16 of the detection circuit array 102 in FIG. 2. The detection circuit 502_1 in FIG. 5 differs from the detection circuit 102_1 in FIG. 3 in that the positive input end (+) of the operational amplifier 106 of the detection circuit 502_1 is coupled to third calibration voltage Vc, to off-set the static noise in the voltage Vout at the output end of the operational amplifier 106 caused by non-ideal factors.

Specifically, in each sampling mode, the voltage difference between the third calibration voltage Vc and the reference voltage Vx is reflected in a specific proportion and accumulates at the output end of the operational amplifier 106 and contributes to the voltage of CS/CI*(Vc−Vx), which accumulates at the output end of the operational amplifier 106. By adjusting the third calibration voltage Vc, it is possible to make CS/CI*(Vc−Vx) just offset the value of the static noise carried by the voltage Vout at the output end of the operational amplifier 106 due to non-ideal factors, so that static noise does not accumulate continuously in the multiple sampling modes.

Figure 6:
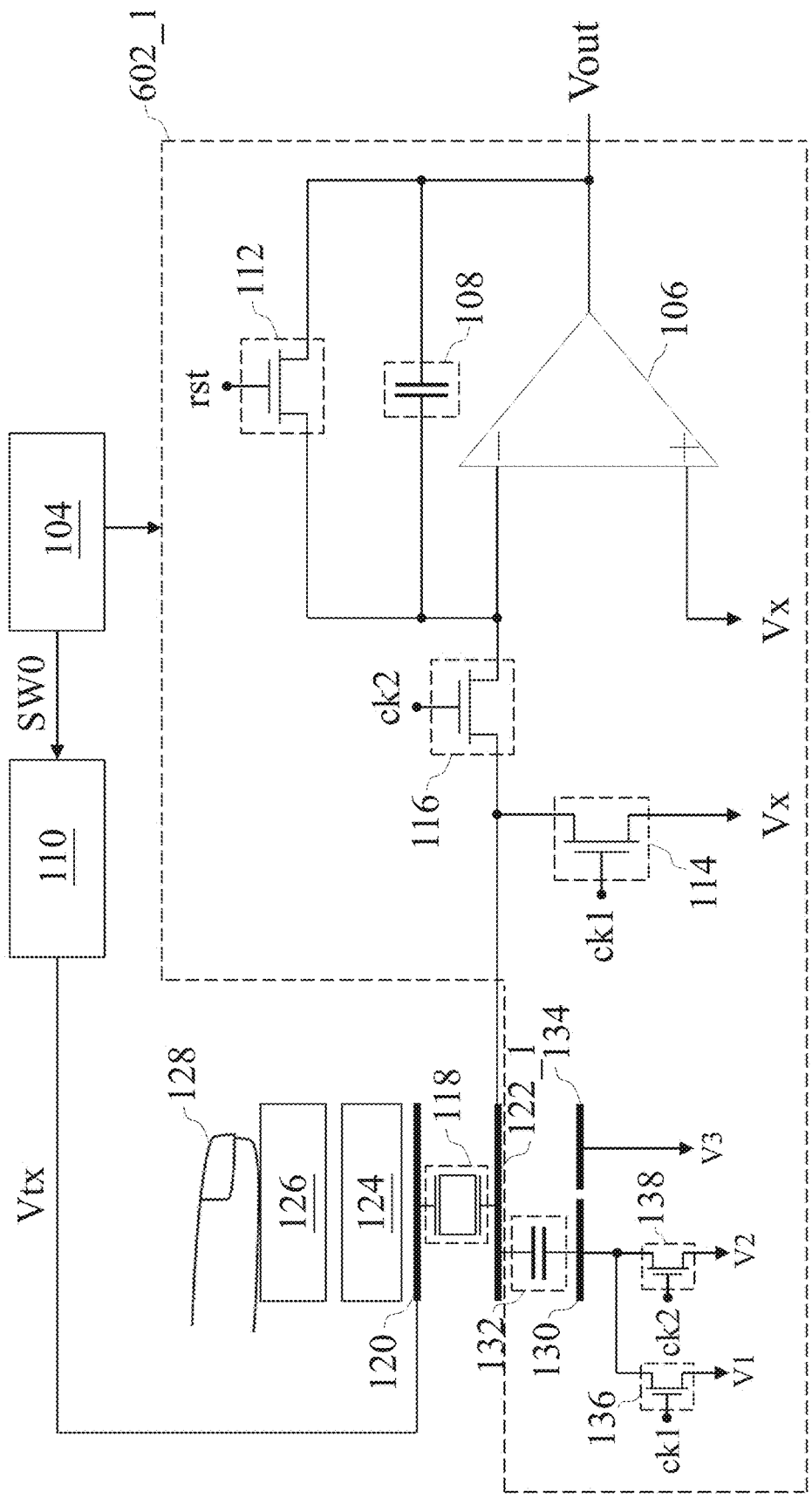
FIG. 6 is a schematic diagram illustrating an ultrasonic image sensor according to a third embodiment of the present disclosure.

FIG. 6 a schematic diagram illustrating an ultrasonic image sensor according to third embodiment of the present disclosure; the detection circuit 602_1 in FIG. 6 can be used to replace each of the detection circuits 102 1~102 16 of the detection circuit array 102 in FIG. 2. The detection circuit 602_1 in FIG. 6 differs from the detection circuit 102_1 in FIG. 3 in that it additional includes a calibration electrode 130, a first calibration switch 136 and a second calibration switch 138 in FIG. 6. The calibration electrode 130 is provided below the lower electrode 122_1 and is parallel to the lower electrode 122_1. The first calibration switch 136 is coupled between the calibration electrode 130 and the first calibration voltage V1, wherein the first calibration switch 136 is under the control of the signal ck1 control, so that the conduction state of the first calibration switch 136 is synchronized with the first switch 114. The second calibration switch 138 is coupled between the calibration electrode 130 and the second calibration voltage V2, wherein the second calibration switch 138 is under the control of the signal ck2 control, so that the conduction state of the second calibration switch 138 is synchronized with the second switch 116. In this case, the calibration electrode 130 and the lower electrode 122_1 have an equivalent parasitic capacitor 132 therebetween, which has a capacitance of CB.

In each sampling mode, the detection circuit 602_1 in FIG. 6, the first calibration switch 136 and the second calibration switch 138 are under the control of the signal ck1 and ck2 and contribute to the voltage of CB/CI*(V1−V2), which accumulates at the output end of the operational amplifier 106. By adjusting the capacitance CB of the calibration capacitor 122, the first calibration voltage V1 and/or the second calibration voltage V2 can make CB/CI* (V1−V2) just offset the value of the static noise carried by the voltage Vout at the output end of the operational amplifier 106 due to non-ideal factors, so that static noise does not accumulate continuously in the multiple sampling modes.

FIG. 6 further includes a shielding electrode 134, provided below the lower electrode 122_1 and parallel to the lower electrode 122_1, wherein the shielding electrode 134 is coupled to a direct current voltage V3, and the shielding electrode 134 is configured to shield the noise coupled to the lower electrode 122_1. The shielding electrode 134 and the calibration electrode 130 can be provided at the same time or alternatively, when the shielding electrode 134 and the calibration electrode 130 are provided at the same time, the shielding electrode 134 and the calibration electrode 130 can be provided at the same level.

Figure 7:
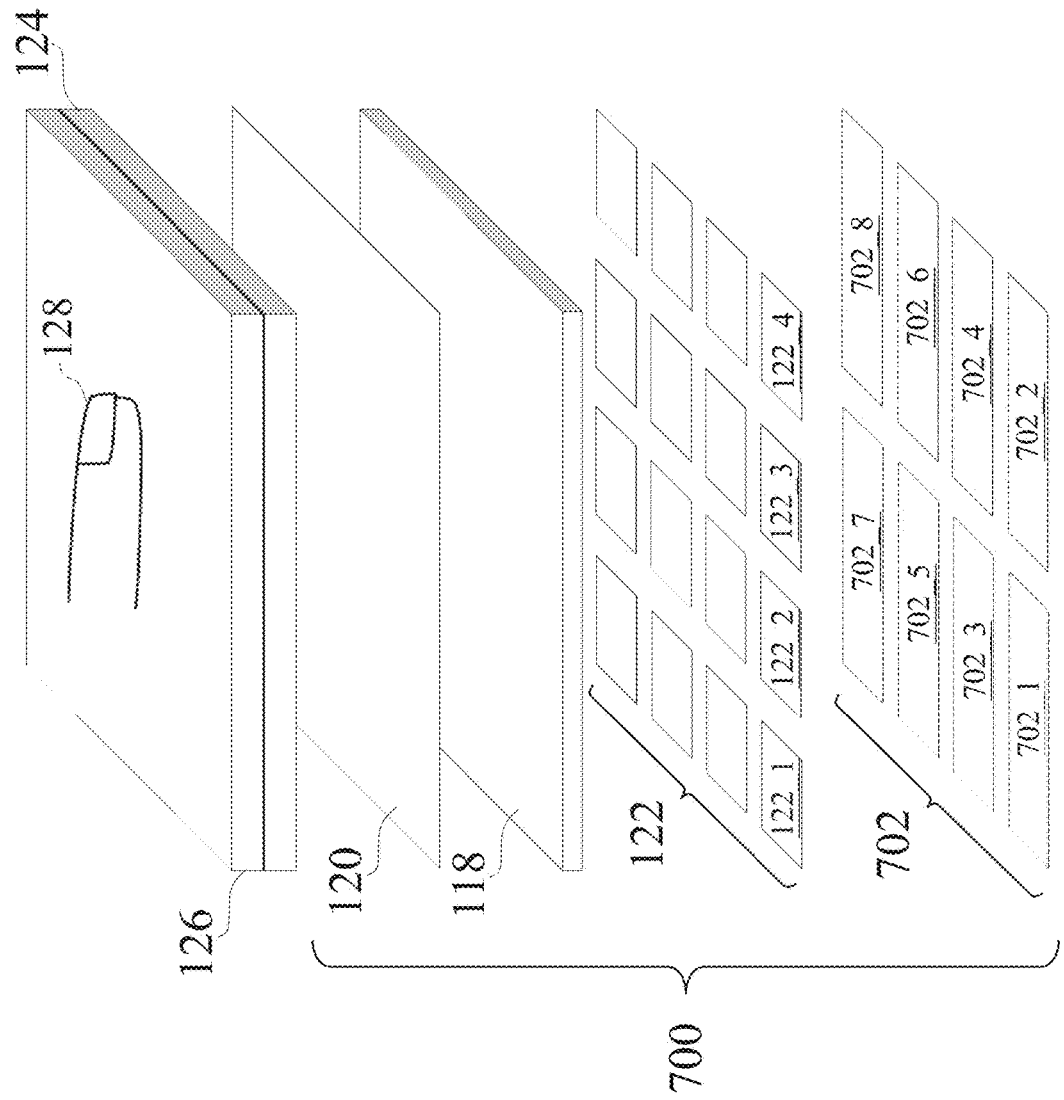
FIG. 7 is a three-dimensional schematic diagram illustrating an ultrasonic image sensor according to a second embodiment of the present disclosure.

FIG. 7 is a three-dimensional schematic diagram illustrating an ultrasonic image sensor according to a second embodiment of the present disclosure. The ultrasonic image sensor 700 differs from the ultrasonic image sensor 100 in that the detection circuit array 702 of the ultrasonic image sensor 700 is implemented using the CMOS process and includes a plurality of detection circuits 702_1~702_8 having the same structure and provided at the same level, in which the plurality of detection circuits 702_1~702_8 are coupled to the plurality of lower electrodes 122_1~122_16 in a one-to-two relationship. That is, two lower electrodes share one detection circuit.

Figure 8:
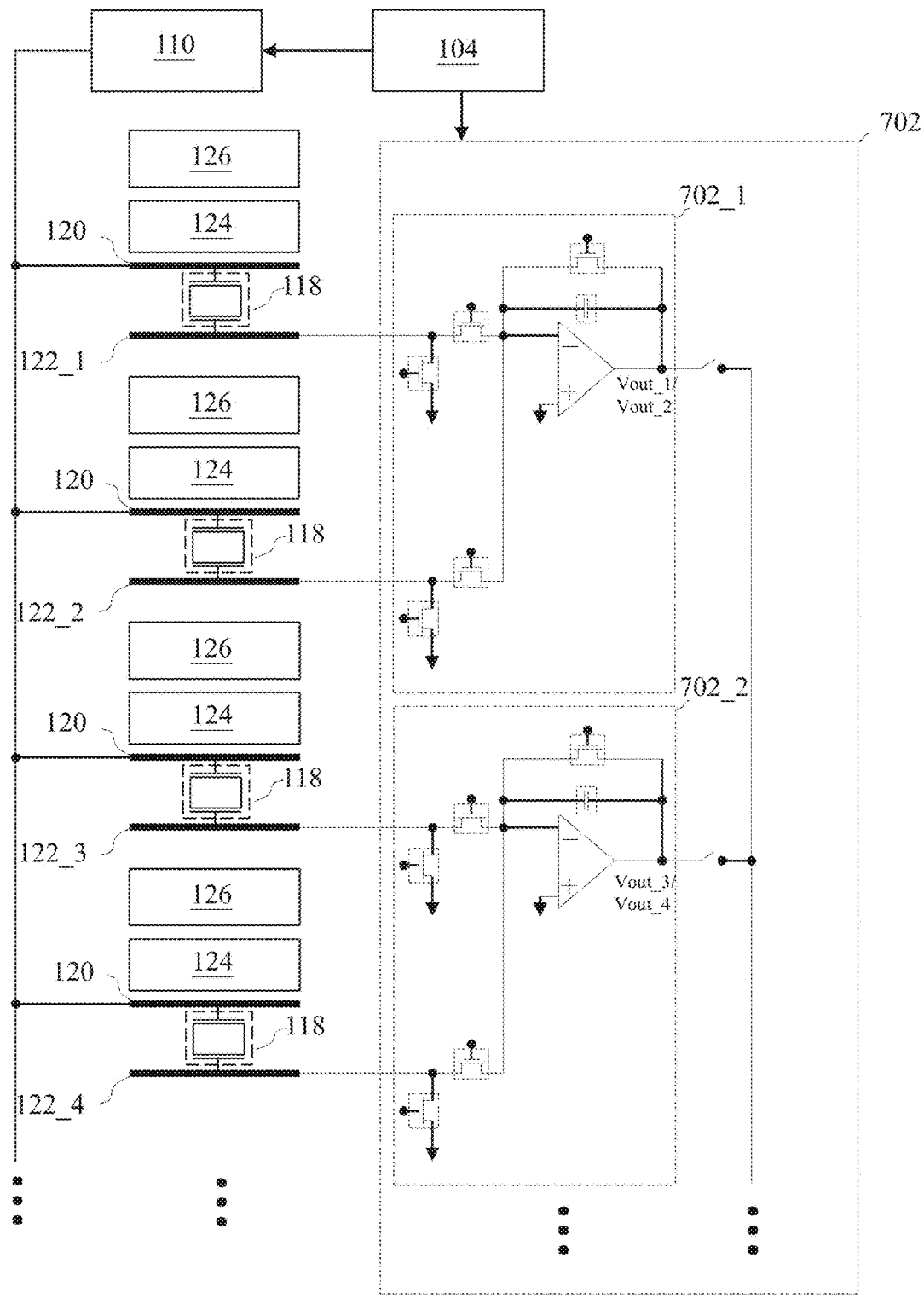
FIG. 8 is a schematic diagram illustrating the circuit connection of the ultrasonic image sensor of FIG. 7 when provided in an electronic device.

FIG. 8 is a schematic diagram illustrating the circuit connection of the ultrasonic image sensor of FIG. 7 when provided in an electronic device. The electronic device 800 includes the ultrasonic image sensor 700, the display screen 124 and the cover plate 126 in FIG. 7, the sinusoidal pulse signal generating circuit 110 and the control circuit 104. The control circuit 104 is configured to control the sinusoidal pulse signal generating circuit 110 and the plurality of detection circuits 702_1~702_8 in the detection circuit array 702. Specifically, the embodiment in FIG. 8 combines the detection circuit 102_1 and the detection circuit 102_2 in FIG. 2 into the detection circuit 702_1; combines the detection circuit 102_3 and the detection circuit 102_4 in FIG. 2 into the detection circuit 702_2, and so on. Take the detection circuit 102_1 and the detection circuit 102_2 for example, the first switch 114 and the second switch 116 of the detection circuit 102_1 and the first switch 114 and the second switch 116 of the detection circuit 102_2 share one set of the operational amplifier 106, the capacitor unit 108, and the reset switch 112, to obtain the detection circuit 702_1.

In other words, the detection circuit 702_1 differs from the detection circuit 102_1 structurally in that the detection circuit 702_1 includes one additional set of the first switch 114 and the second switch 116 (referred to below as the third switch and fourth switch) than the detection circuit 102_1, wherein the third switch is coupled between the reference voltage Vx and lower electrode 122_2; the fourth switch is coupled between lower electrode 122_2 and the negative end of the operational amplifier 106 of the detection circuit 702_1. Since some of the components are shared, the detection at the lower electrode 122_1 and lower electrode 122_2 is performed in a time-sharing manner.

In certain embodiments, the ultrasonic image sensors 100/800 further include a digital to analog converter, which is coupled to each detection circuit of the detection circuit array 102/702 through switches.

The advantage of the embodiments according to the present disclosure is that the detection circuit array 102/702 implemented using the CMOS process can have an accuracy better than 0.2 um and can easily achieve a pixel size (resolution) of 50 um, which can improve the accuracy of under-screen fingerprint recognition. Further, the operational amplifier implemented using the CMOS integrated circuit process has excellent performance and can improve the signal-to-noise ratio. Taking the timing diagram in FIG. 4 as an example, the signal-to-noise ratio can be improved by 10 times after repeating n periods. Moreover, the detection circuit array 102/702 implemented using the CMOS process can be easily integrated with the readout circuit and digital-to-analog converter together in the same chip, with short interconnection lines between them, and hence the readout process has excellent resistance to environmental interference.

The electronic device 200/800 according to the present disclosure includes, but is not limited to, a mobile communication device, an ultra-mobile personal computer device, a portable entertainment device, and other electronic devices having a data interaction function. Mobile communication devices are characterized by mobile communication functions and have the primary goal of providing voice and data communication. Such terminals include: smartphones (e.g., iPhone), multimedia phones, functional phones, and low-end cell phones. Ultra-mobile personal computer devices belong to the category of personal computers, which have computing and processing functions and generally also have mobile Internet access characteristics. Such terminals include: PDA, MID and UMPC devices, such as iPad. Portable entertainment devices can display and play multimedia content. Devices in this category include: audio and video players (e.g. iPod), handheld game consoles, e-books, and smart toys and portable car navigation devices.

The foregoing outlines features of several embodiments of the present application so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alternations herein without departing from the spirit and scope of the present disclosure.

What is claimed is:

1. A ultrasonic image sensor, wherein the ultrasonic image sensor is coupled to a sinusoidal pulse signal generating circuit, the ultrasonic image sensor and the sinusoidal pulse signal generating circuit provided below a cover plate, the ultrasonic image sensor is configured to sense a surface pattern of object to be measured that makes contact with the cover plate from above the cover plate, the ultrasonic image sensor comprises:

an upper electrode, coupled to the sinusoidal pulse signal generating circuit;

a lower electrode array, including a first lower electrode;

a piezoelectric layer, provided between the upper electrode and the lower electrode array, wherein the piezoelectric layer is excited by means of a sinusoidal pulse signal generated by the sinusoidal pulse signal generating circuit so as to generate ultrasonic wave, the ultrasonic wave is transmitted along the cover plate to the object to be measured and then a reflected echo is generated, and the reflected echo along the cover plate is transmitted back to the piezoelectric layer, so that the piezoelectric layer generates a receiving signal; and a detection circuit array, including a first detection circuit, coupled to the first lower electrode and configured to determine amplitude of the receiving signal, wherein the first detection circuit comprises:

an operational amplifier, having a positive end, a negative end and an output end, wherein the output end is configured to output a sensing result of the ultrasonic image sensor;

a capacitor unit, coupled between the output end and the negative end of the operational amplifier;

a reset switch, arranged in parallel with the capacitor unit;

a first switch, coupled between a reference voltage and the first lower electrode; and a second switch, coupled between the first lower electrode and the negative end of the operational amplifier, wherein in a general phase that the reset switch is turned off, after n pulse periods of the sinusoidal pulse signal, a voltage at the output end of the operational amplifier is successively accumulated n times, where n is a positive integer, wherein each pulse period of the sinusoidal pulse signal includes a first time period and second time period, wherein in the first time period, the sinusoidal pulse signal includes N sinusoidal waves, each having a period equal to t, and N is a positive integer, wherein in the second time period, the sinusoidal pulse signal has a fixed voltage, and the first detection circuit detects the receiving signal according to each pulse period, wherein:

in a reset phase, the reset switch is turned on and the second switch is turned off, the output end of the operational amplifier outputs the reference voltage; and in the general phase, the reset switch is turned off, and the receiving signal at least includes N waves, each having a period equal to t, wherein the N waves correspond to one of the n pulse periods of the sinusoidal pulse signal, wherein in each period of the N waves, the first detection circuit is set to a sampling mode for a time period equal to t*R and is set to a non-sampling mode for a time period equal to t*(1−R), wherein R is greater than 0 and is smaller than 1, wherein:

in the sampling mode, the first switch is turned off and the second switch is turned on, so that amplitude change of the receiving signal during the sampling mode is reflected in a specific proportion and is accumulated at the output end of the operational amplifier; and in the non-sampling mode, the first switch is turned on and the second switch is turned off, so that the amplitude change of the receiving signal generated by the piezoelectric layer in the non-sampling mode does not respond and does not accumulate at the output end of the operational amplifier, so that the voltage at the output end of the operational amplifier remains constant in the non-sampling mode.

2. The ultrasonic image sensor according to claim 1, further comprising:

a control circuit, configured to control the sinusoidal pulse signal generated by the sinusoidal pulse signal generating circuit, and control the reset switch, the first switch and the second switch of the first detection circuit.

3. The ultrasonic image sensor according to claim 1, wherein the lower electrode array further comprises a second lower electrode, and the detection circuit array further comprises a second detection circuit, wherein a structure of the second detection circuit is the same as a structure of the first detection circuit, and the second detection circuit is coupled to the second lower electrode.

4. The ultrasonic image sensor according to claim 1, wherein R is ½, and:

the first detection circuit is set to the sampling mode during the time period equal to t*R when the N waves of the receiving signal drop from its peak to its trough; and the first detection circuit is set to the non-sampling mode during the time period equal to t*(1−R) when the N waves of the receiving signal rise from its trough to its peak.

5. The ultrasonic image sensor according to claim 4, wherein capacitance of the capacitor unit is CI, capacitance of a parasitic capacitor of the piezoelectric layer is CS, a voltage difference between the peak and the trough of the N waves is 2*VA, and the N waves drop from its peak to its trough, so that the voltage at the output end of the operational amplifier increases by 2*N*VA*CS/CI.

6. The ultrasonic image sensor according to claim 1, wherein the positive end of the operational amplifier is coupled to a third calibration voltage.

7. The ultrasonic image sensor according to claim 1, further comprising:

a shielding electrode, provided below the first lower electrode, wherein the shielding electrode is coupled to a direct current voltage, and the shielding electrode is configured to shield a noise coupled to the first lower electrode.

8. An electronic device, comprising:

the ultrasonic image sensor according to claim 1;
the sinusoidal pulse signal generating circuit; and
the cover plate.

9. The electronic device according to claim 8, further comprising a display screen, wherein the cover plate is provided at one side of the display screen, and the ultrasonic image sensor and the sinusoidal pulse signal generating circuit are provided at another side of the display screen.

10. The electronic device according to claim 9, wherein the display screen allows sound waves to pass through.

11. A ultrasonic image sensor, wherein the ultrasonic image sensor is coupled to sinusoidal pulse signal generating circuit, the ultrasonic image sensor and the sinusoidal pulse signal generating circuit provided below a cover plate, the ultrasonic image sensor is configured to sense a surface pattern of object to be measured that makes contact with the cover plate from above the cover plate, the ultrasonic image sensor comprises:

an upper electrode, coupled to the sinusoidal pulse signal generating circuit;

a lower electrode array, including a first lower electrode and a second lower electrode;

a piezoelectric layer, provided between the upper electrode and the lower electrode array, wherein the piezoelectric layer is excited by means of a sinusoidal pulse signal generated by the sinusoidal pulse signal generating circuit so as to generate ultrasonic wave, the ultrasonic wave is transmitted along the cover plate to the object to be measured and then a reflected echo is generated, and the reflected echo along the cover plate is transmitted back to the piezoelectric layer, so that the piezoelectric layer generates a receiving signal; and a detection circuit array, including a first detection circuit, coupled to the first lower electrode and configured to determine amplitude of the receiving signal, wherein the first detection circuit comprises:

an operational amplifier, having a positive end, a negative end and an output end, wherein the output end is configured to output a sensing result of the ultrasonic image sensor;

a capacitor unit, coupled between the output end and the negative end of the operational amplifier;

a reset switch, arranged in parallel with the capacitor unit;

a first switch, coupled between a reference voltage and the first lower electrode;

a second switch, coupled between the first lower electrode and the negative end of the operational amplifier;

a third switch, coupled between the reference voltage and the second lower electrode; and a fourth switch, coupled between the second lower electrode and the negative end of the operational amplifier.

12. A ultrasonic image sensor, wherein the ultrasonic image sensor is coupled to sinusoidal pulse signal generating circuit, the ultrasonic image sensor and the sinusoidal pulse signal generating circuit provided below a cover plate, the ultrasonic image sensor is configured to sense a surface pattern of object to be measured that makes contact with the cover plate from above the cover plate, the ultrasonic image sensor comprises:

an upper electrode, coupled to the sinusoidal pulse signal generating circuit;

a lower electrode array, including a first lower electrode;

a piezoelectric layer, provided between the upper electrode and the lower electrode array, wherein the piezoelectric layer is excited by means of a sinusoidal pulse signal generated by the sinusoidal pulse signal generating circuit so as to generate ultrasonic wave, the ultrasonic wave is transmitted along the cover plate to the object to be measured and then a reflected echo is generated, and the reflected echo along the cover plate is transmitted back to the piezoelectric layer, so that the piezoelectric layer generates a receiving signal;

a detection circuit array, including a first detection circuit, coupled to the first lower electrode and configured to determine amplitude of the receiving signal, wherein the first detection circuit comprises:

an operational amplifier, having a positive end, a negative end and an output end, wherein the output end is configured to output a sensing result of the ultrasonic image sensor, and the positive end of the operational amplifier is coupled to a reference voltage;

a capacitor unit, coupled between the output end and the negative end of the operational amplifier;

a reset switch, arranged in parallel with the capacitor unit;

a first switch, coupled between the reference voltage and the first lower electrode; and a second switch, coupled between the first lower electrode and the negative end of the operational amplifier;

a calibration electrode, provided below the first lower electrode;

a first calibration switch, coupled between the calibration electrode and a first calibration voltage, wherein a conduction state of the first calibration switch is synchronized with the first switch; and a second calibration switch, coupled between the calibration electrode and a second calibration voltage, wherein a conduction state of the second calibration switch is synchronized with the second switch;

wherein the calibration electrode, the first calibration switch, and the second calibration switch are configured to offset a static noise at the output end of the operational amplifier.

* * * * *